Figure 2:
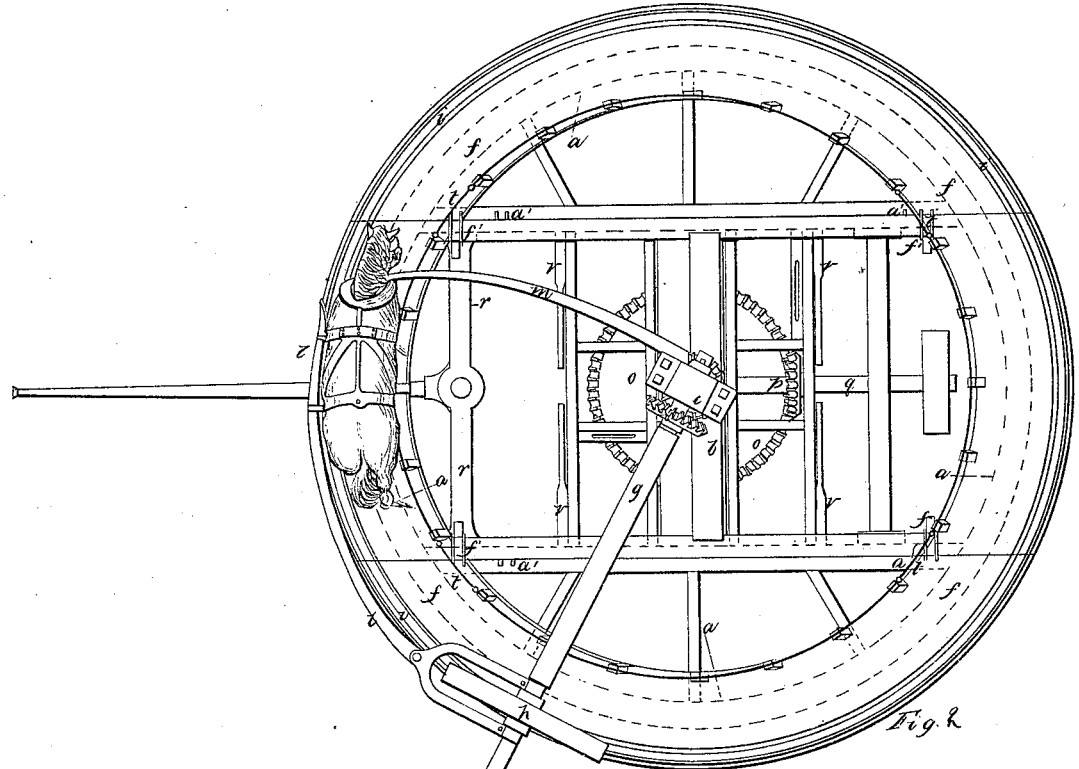
Figure 3:
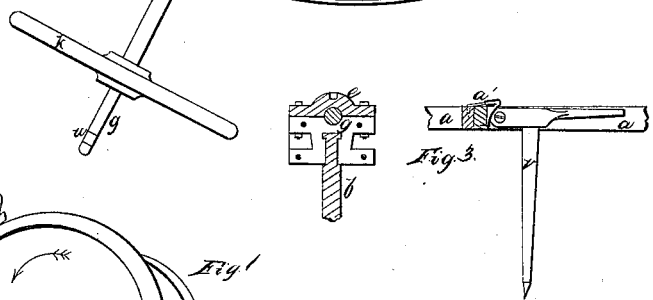
Figure 1:
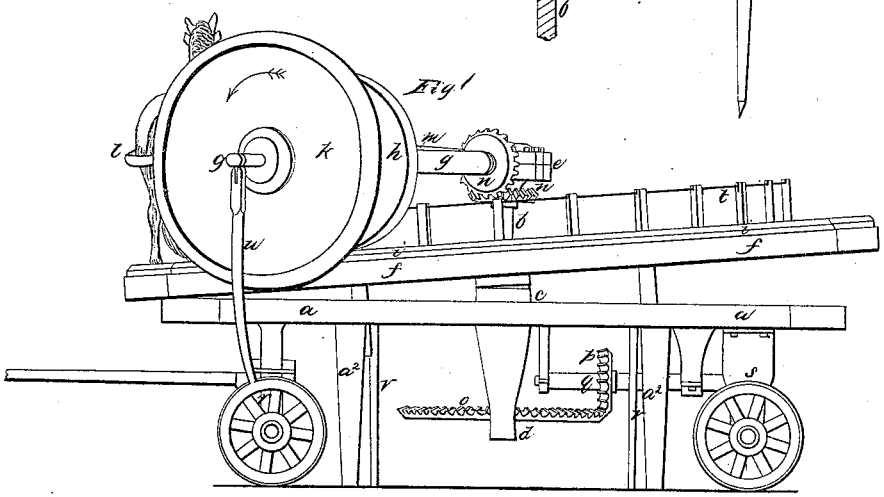

D. Russell,
Horse Power,

N° 9,221.           Patented Aug. 24, 1852.

UNITED STATES PATENT OFFICE.

DAVID RUSSELL, OF ST. LOUIS, MISSOURI.

HORSE-POWER.

Specification of Letters Patent No. 9,221, dated August 24, 1852.

*To all whom it may concern:*

Be it known that I, DAVID RUSSELL, of St. Louis, in the State of Missouri, have invented certain new and useful Improvements in Horse-Powers, and that the following is a full, clear, and exact description of the principle or character which distinguishes them from all other things before known and of the usual manner of making, modifying, and using the same.

My improvement consists of a novel method of employing the power of horses, by which their weight, as well as draft, is rendered available, and by which the velocity of the running parts is not reduced, by extending the circle or sweep upon which the friction wheel travels.

The construction of my machine is as follows:—I erect a horizontal circle ($a$) of wood, or other suitable material, making it perfectly level, and firmly fixed in position. At the center of this circle ($a$,) I sustain a vertical shaft ($b$,) in proper bearings, connected with the circle above named, the upper bearing being a little above the level of the circle at ($c$,); and the lower one, which forms a step ($d$) being at a proper distance below the circle ($a$.) The shaft ($b$,) extends up through the upper collar, or bearing ($c$,), and bears on its upper end a box ($e$,), to be hereafter more particularly described. Above the level circle there is a large wheel ($f$,), of sufficient size to form the tread upon which the horse walks; and this wheel is so supported at the center as to be readily depressed at any point upon its rim where a weight is placed, till said rim touches the lower circle ($a$,). For this purpose the upper part of the bearing ($c$,) is semi-spherical, and fits into a concavity in the wheel; from the box ($e$,) a shaft ($g$,) extends out horizontally at right angles to the shaft ($b$,) above described, said shaft ($g$,) having its bearing in box ($e$,). At the outer circumference of the wheel ($f$,) there is a wheel ($h$,) affixed to said shaft ($g$,), which runs upon a rib ($i$) on said wheel ($f$,), which by friction causes the shaft ($g$) to turn as the wheel ($h$) runs around the tread upon wheel ($f$,). The shaft ($g$,) extends out beyond the wheel ($h$,), and supports a fly wheel ($k$,), which increases the weight and friction, and regulates the speed. To this shaft there is a pole ($l$,), to which a horse is hitched to draw by, and another pole ($m$,) is firmly affixed to the box ($e$,), and extending out radially, is attached also to the horse, who is guided thereby, and walks around the tread upon the large wheel ($f$,), and depresses it in front of the wheel ($h$,), causing said wheel to be running down hill all the time; which adds to its effect by means of the weight of the horse in addition to his draft. The two shafts ($g$,) and ($b$,) are geared together by bevel gearing ($n$,), and near the lower end of shaft ($b$,) there is a crown wheel ($o$,) into which a pinion ($p$,) on the line shaft ($q$,) works, by which the power is conveyed off.

The above is a description of the power when made stationary; but for a portable machine, such as is represented in the drawings, other devices are required. Two axles ($r, s$,) are made to support a central portion of the circle ($a$,), say six feet breadth, and the whole diameter fore and aft; at ($a'$,) are the attachments, by which the side segments are attached by spring hooks, that bind the parts firmly together. These segments are supported by legs ($a^2$,); the center portion upon the wheels, when the machine is put up for use, is first leveled by two spirit levels affixed to a portion of the frame, and then four bent levers $v$ attached thereto, which serve as props, are brought down and held by weights on their horizontal arms to support the machine in its level position and guide the setting of the legs on the segments. The upper wheel ($f$,) has a similar section as the circle below, with two segments, one on either side, fastened at the points ($f'$,), and as an additional stay the guard rail is also united at the points ($t$,). It is obvious that a horse could be placed on the ground to aid in drawing around the shaft ($g$,) by being hitched to its outer end at ($u$).

Having thus fully described my improved horse power, what I claim therein as new, and desire to secure by Letters Patent, is,

1. The combination of the canting tread wheel ($f$,) and horizontal sweep shaft ($g$,) and friction wheel ($h$,) for producing motion in the manner described.

2. The wheel ($h$,) is always running down hill by throwing the weight of the horse onto the canting wheel ($f$,) just forward of it, as above described.

DAVID RUSSELL.

Witnesses:
J. BECKWITH WEST,
JOHN L. SMITH.